United States Statutory Invention Registration [19]

[11] Reg. Number: H910

Hindenach

[43] Published: Apr. 2, 1991

[54] ADAPTIVE TWO DIMENSIONAL SHADING FOR BATCH SYNTHETIC APERTURE RADAR USING PHASED ARRAY ANTENNA

[75] Inventor: Laurence J. Hindenach, Jessup, Md.

[73] Assignee: The United States of America as represented by the Secretary of the Air Force, Washington, D.C.

[21] Appl. No.: 363,667

[22] Filed: Jun. 8, 1989

[51] Int. Cl.[5] ..... G01S 13/00

[52] U.S. Cl. ..... 342/25; 342/92; 342/191

[56] References Cited

U.S. PATENT DOCUMENTS 3,725,915 4/1973 Herman et al. .

3,976,998 8/1976 Voles et al. .

4,227,194 10/1980 Herman et al. .

*Primary Examiner*—Linda J. Wallace

*Attorney, Agent, or Firm*—Gerald B. Hollins

[57] ABSTRACT

A technique for correcting the non-uniform illumination and return echo strength from a mapped area resulting from antenna beam shape and range loss effects in a batch high resolution synthetic aperture radar. The technique involves changing the radar receiver gain in a precisely defined compensating manner and eliminates amplitude roll off at the edges of the display map so that equal target returns are displayed at equal amplitudes at any point of the map. The compensation arrangement requires minimal memory and computational overhead and thereby achieves minimal impact on frame time of the displayed map. The disclosure includes a computer simulation of the radar system performance and comparison of the simulated before and after compensation radar maps.

14 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADAPTIVE TWO DIMENSIONAL SHADING FOR BATCH SYNTHETIC APERTURE RADAR USING PHASED ARRAY ANTENNA

RIGHTS OF THE GOVERNMENT

The invention described herein may be manufactured and used by or for the Government of the United States for all governmental purposes without the payment of any royalty.

BACKGROUND OF THE INVENTION

This invention relates to the field of radar signal processing for a doppler batch synthetic aperture radar (SAR). and especially to the compensations used to provide return signals of equal amplitude from diversely located target points in the presence of antenna beam pattern and range attenuation effects.

In previous SAR ground mapping systems corrections for beam shape and range effect have been accomplished in a variety of ways, the most common of which involves selective spoiling of the radar beam. In this common prior arrangement, a cosecant squared beamshape is often employed in order to accommodate range and beam-shape attenuation affects in the radar return signal. Beam spoiling is, however, a highly complex scheme when employed in a phased array antenna radar system and excessive beam spoiling results in large doppler ambiguity effects and significant losses of system gain. Nevertheless, beam spoiling is often employed, especially in the elevation direction of a SAR ground mapping system, and usually in the form of representative beamshape correction curves for a variety of mapping geometry situations. Usually these corrections involve the return signal being multiplied by a range correction factor. Imperfections in these prior gain corrections, however, give rise to the need for correction arrangements suitable for use with complex antennas and beam patterns which include significant gain falloff toward the edge of a mapped region.

It is desirable for an improved gain correction arrangement to be adaptable to a variety of beamshaped geometries that are within the performance window of a doppler SAR system, and for the gain corrections to be generated in a small time period—a period having minimal impact on the frame time of the radar system. It is also desirable for the gain correction to be applicable to more than one resolution cell of a mapped area in order to minimize correction memory requirements and for the gain correction factors to be smooth in nature so there are no large discontinuities in the mapped area and no large roll off from one side of the mapped area to another.

SUMMARY OF THE INVENTION

The present invention provides a near real time gain correction arrangement for compensating the effects of antenna beam shaped and differences in slant range to the objects in a mapped radar scene. The gain correction factor to be used at any point of the mapped area is determined through use of a mathematically representable gain surface function that is fitted in an optimum manner to the beam pattern and the range loss characteristics of the SAR system and its antenna. From an estimate of the gain in various points of the SAR map, the known beam shape and range effects are calculated and these points are then used to obtain a least squares fit surface to the gain over the entire map; the resulting gain surface is then used to generate the actual corrections to be applied to an algorithm for correction of non-uniform illumination and range attenuation.

It is an object of the invention to provide a shading or gain correction arrangement for a doppler synthetic aperture radar mapping apparatus.

It is another object of the invention to provide a mathematically described radar gain correction function.

It is another object of the invention to provide a mathematically described gain correction function which is mathematically fitted to the actual values of a radar return signal.

It is another object of the invention to provide a gain compensating arrangement which provides corrected gain variations of generally less than two decibels signal strength variation over the mapped surface area.

It is another object of the invention to provide a mapped area gain compensation arrangement which requires a minimal amount of information storage memory for its utilization.

It is another object of the invention to provide a mapped area gain correction arrangement in which signal strength variation effects in addition to range and antenna beam pattern may be readily accommodated.

Additional objects and features of the invention will be understood from the following description and the accompanying drawings.

These and other objects of the invention are achieved by a method of amplitude equalizing the target return echo signals of a batch processed synthetic aperture pulsed doppler radar in accommodation of beam shape and target range perturbations of the return signal amplitudes over a target scene frame. This includes the steps of storing a target scene frame consisting of an array of doppler frequency and range domain radar echo signal amplitudes data, the data being organized according to range cells dispersed across the target scene frame; selecting a predetermined number of points in the doppler frequency and range domain for performing antenna beam shape gain determinations; transforming the location of the gain determination points from the doppler frequency and range domain into points within the domain of an antenna face related coordinate system; performing antenna pattern gain determinations at each of the antenna coordinate domain points assuming a predetermined three dimensional beam shape; incorporating range attenuation effect corrections into each of the antenna coordinate domain points gain determinations; determining the numeric coeffecients for a selected mathematically definable three dimensional gain surface extending in both the frequency and range directions, the gain surface being optimally conformed with the range loss corrected antenna coordinate domain points; dividing the mathematically described gain surface into a predetermined number of range associated bands, each band including all of the frequency related gain surface values for a selected span of range values; ascertaining for the central most range values in each of the range bands, the numerical coefficients of a gain surface resident two-dimensional mathematical curve of gain versus frequency; computing from each of the two dimensional mathematical curves the gain values at predetermined range cell locations disposed along each curve; generating from the gain values a resolution cell dispersed array of inverse gain magnitude values; multiplying the amplitude values of the target frame range cell data by range cell respective inverse gain array values.

DETAILED DESCRIPTION

Figure 1:
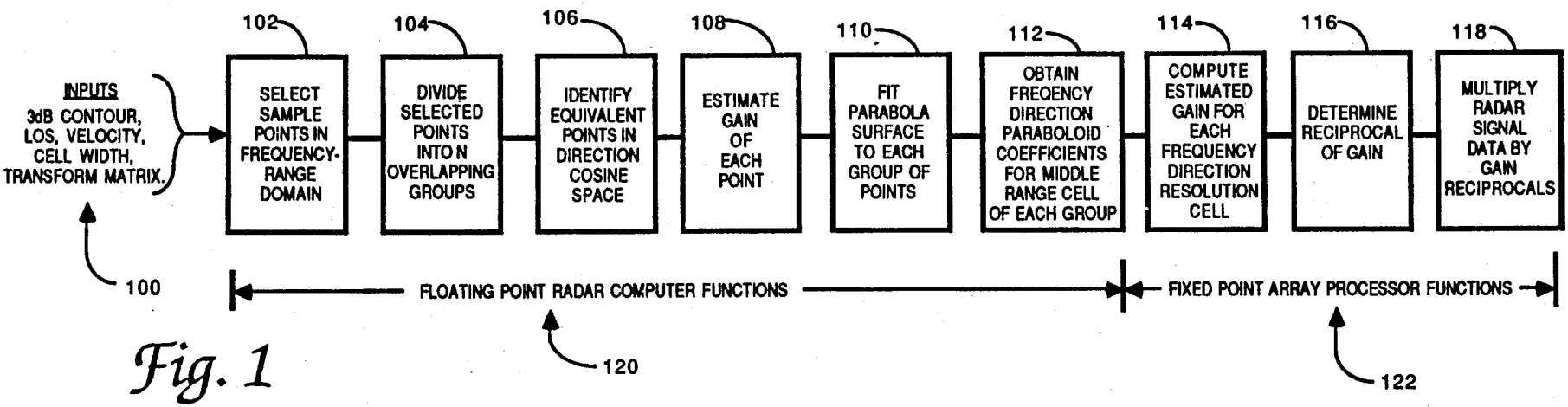
FIG. 1 shows a sequence of steps for accomplishing the gain correction shading of the present invention.

FIG. 1 of the drawings shows a sequence of steps by which a batch operated high resolution synthetic aperture radar (SAR) operating in the spotlight batch mode may be compensated for variations in return signal strength to achieve substantially uniform signal strength characteristics over a mapped area. In the FIG. 1 mapping arrangement, the beam maximum is assumed to be pointed at the center of the map and a beam pattern roll off of 3 dB or less in one-way power relative to the beam center is presumed. Without the beam compensation afforded by the FIG. 1 system, signal variations across the face of a SAR mapped area could be expected to include returns separated by as much as 6 dB in signal strength, a map of this type is shown in the computer simulation of FIG. 5A of the drawings.

Figure 5A:
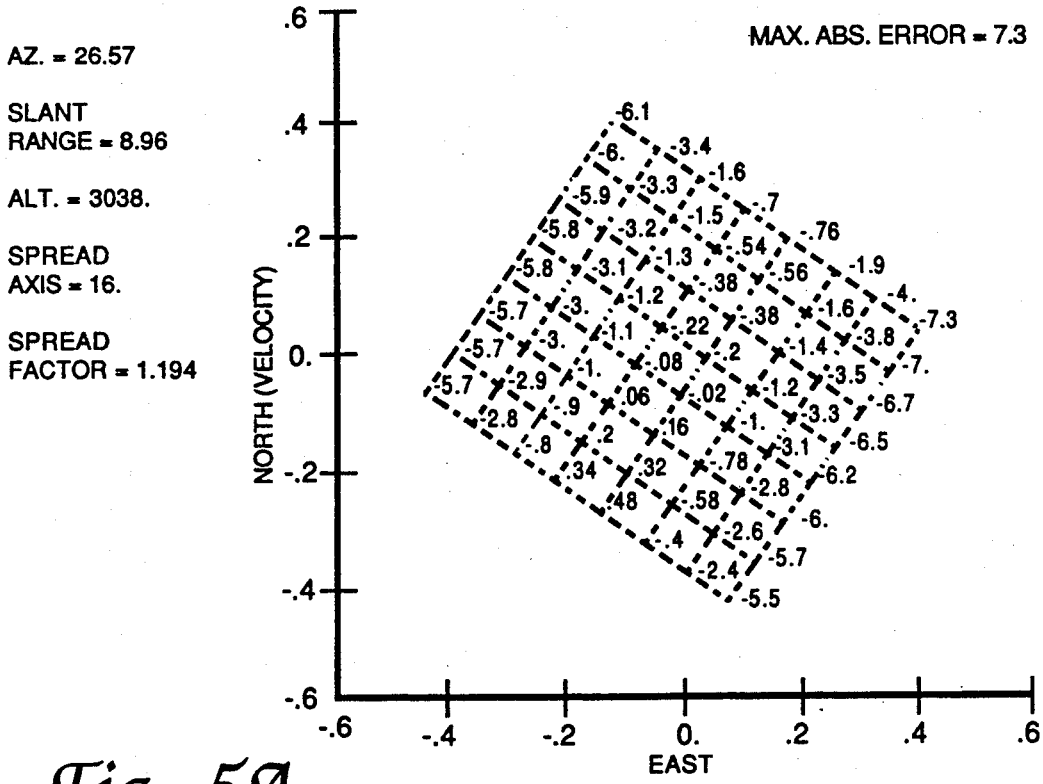
FIG. 5 including the views of FIGS. 5A and 5B shows computer simulated uncompensated and compensated map images.

The FIG. 5A map illustrates large signal strength variations between the center and some edge portions of the mapped area and additional signal strength variations resulting from the range effect. The latter range effect causes points at the near edge of the mapped area to be of greater amplitude relative to the center of the map and points at the far edge of the mapped area to be lower in amplitude. The FIG. 5A variation resulting from beam energy pattern distribution occurs in the form of 3 db signal attenuation during transmission and an additional 3 dB of attenuation during reception where edge portions of the radar antenna are involved.

It is notable that a prediction of signal strength to be expected across the face of a SAR mapped area is achieved with some difficulty since amplitude of the radar beam at each map point, that is, at each resolution cell requires the summation of amplitude and phase contributions to the signal at that location from each element of the radar antenna. In a typical phased array antenna, there are, of course, hundreds or thousands of elements in the antenna array and the required summation must be accomplished for each of the thousands of resolution cells in the mapped area. It is also interesting to note that a gain correction arrangement that is based on amplitude and phase contributions of each element in a phased array antenna would consume a prohibitive amount of time with respect to the frame time of the radar system. Furthermore, corrections based on one representative beam pattern that has been stored are also unpractical since each geometry within the performance envelope of a radar system involves a different beam shape. Corrections based on each resolution cell of a mapped area are also impractical in that a prohibitively large amount of storage memory is required for such systems.

Before embarking into a description of the FIG. 1 gain correction arrangement, it is perhaps appropriate to consider some basic principals of a batch operated SAR mapping system. According to these principals, the antenna of a batch SAR system, presumably an aircraft mounted antenna, is aimed at a particular point on the ground surface being mapped, a point at the center of the mapped area, and the vector between the antenna center and this point in the mapped area is considered to be the line of sight or LOS vector for the map frame. The LOS vector is indicated at 204 in the mapping arrangement of FIG. 2.

A resolution cell in a SAR mapped area is defined in terms of a doppler frequency and a range distance from the mapping aircraft. For the aircraft 200 in FIG. 2, returns of a constant doppler frequency originate in cones of constant doppler contour—that is cones having an axis coincident with the velocity vector 220 of the aircraft 200 and apices at the center of the aircraft antenna and with conical intersections with the ground mapped area 218 occurring on radial appearing lines—when the mapping aircraft is relatively far from the mapped area. The coordinates of a particular point in a SAR mapped area are, therefore, expressed in terms of a doppler frequency and a range and such points are said to be in the range and frequency domain.

For the sake of data manipulation or processing convenience, it is also desirable to recognize that the location of a point in this range and frequency domain may also be defined in terms of direction cosine space, that is, by a set of coordinates which are related to the SAR antenna and, in fact, have origin at the center of the antenna and employ only a unit vector. The direction cosine coordinates of a particular point therefore are the X and Y components of the coordinate related to the antenna face. The location of a given point in a SAR mapped area may be expressed either in range and frequency domain components, that is, a doppler frequency of, for example, 500 hertz and a range of 4,000 feet or equivalently in direction cosine coordinates. The transformation of range and frequency domain coordinates into direction cosine coordinates is often accomplished through use of a mathematical transformation, conveniently in the form of a transformation matrix, expressed in terms of X and Y direction cosine coordinates. The transformation matrix for relating direction cosine and frequency range domain coordinates is, of course, variable in nature according to the positioning of the mapping aircraft and SAR antenna with respect to the mapped area. Considering then the gain compensating arrangement described in the flow diagram of FIG. 1, the input information used in the gain compensation is identified at 100 in FIG. 1 and includes the 3 dB contour of the SAR antenna, a contour which might appear as shown at 400 in FIG. 4; the line of sight vector, that is, the coordinates of a point along the vector joining the antenna center and the center of the frame to be mapped; the mapping aircraft velocity, the dimensions of a resolution cell in the mapped area; and a transformation matrix suitable for transforming frequency-range domain coordinates into antenna domain or direction cosine space coordinates.

The first step of the gain correction processing is indicated in the block 102 in FIG. 1 and includes a selection of the sample points in the frequency—range domain for which a gain estimation is to be made. In a typical arrangement of the invention, the points selected in the block 102 may be, for example, 18 in number, preferably the selected sample points are divided into a plurality of groups having an overlapping nature, that is, groups wherein boundary located points are considered to be a part of each of the two adjacent groups with the number of employed groups normally being three and with the groups preferably being selected according to range or distance from the SAR antenna. The division into three or some other number N of overlapping groups is indicated in the block 104 in FIG. 1.

Figure 4:
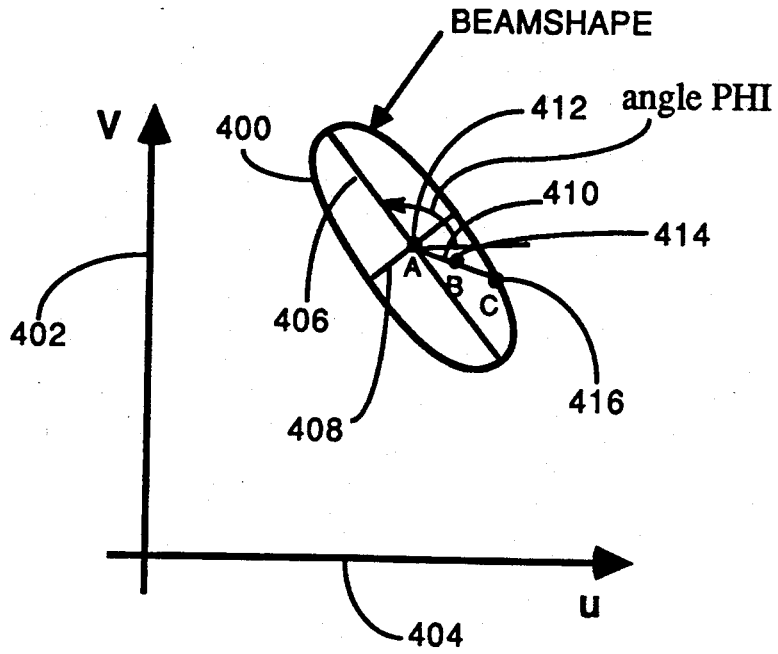
FIG. 4 shows the half power point beam shape of the FIG. 2 radar apparatus in three dimensional directional cosine space.

The transformation from navigation coordinates to antenna coordinates, that is, from the frequency range domain to, for example, cosine space is indicated in the block 106 in FIG. 1. This transformation may be accomplished with the use of a transformation matrix or by other mathematical manipulation known in the art. In the antenna coordinate or direction cosine space, the beam shape, such as the beam shape 400 in FIG. 4 is constant and not a function of map frame variables. In the block 106, each sample point with its specific value in range and doppler frequency can be translated to a point in direction cosine space.

Figure 2:
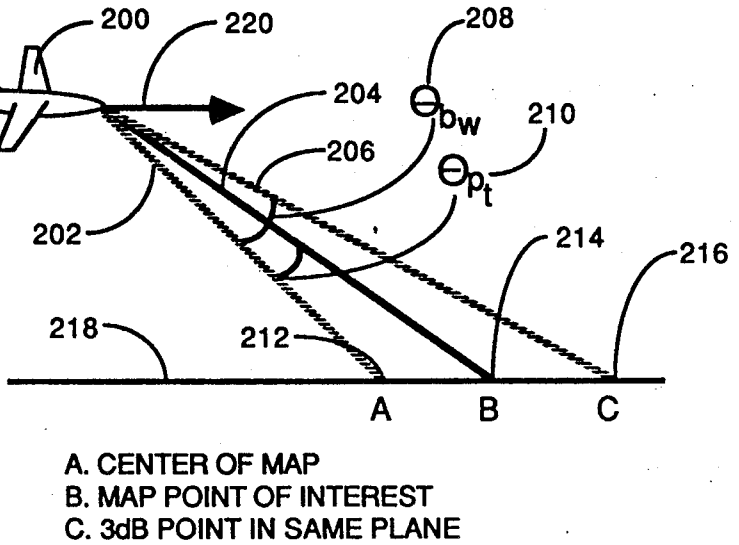
FIG. 2 shows a typical SAR mapping arrangement along with several principal variables involved in gain correction.
Figure 3:
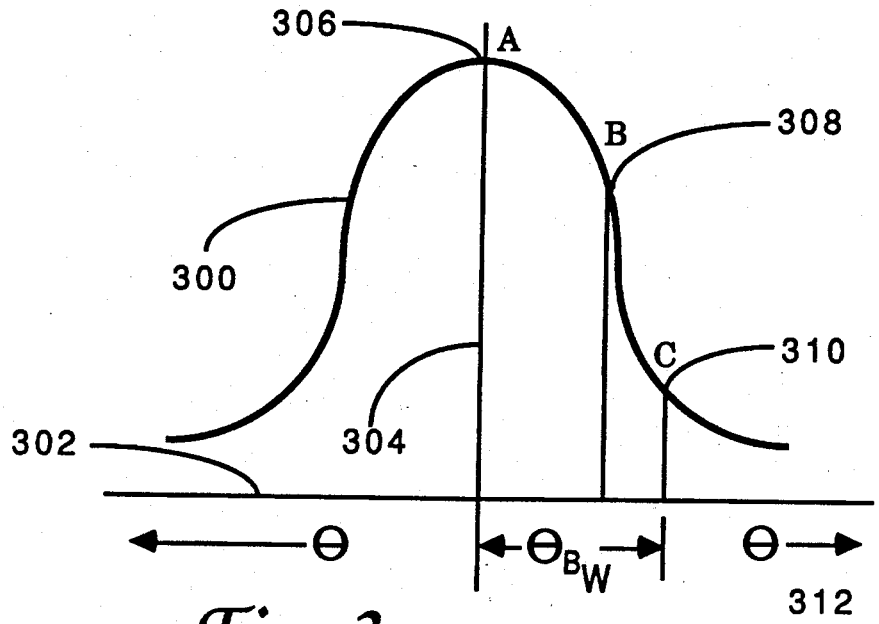
FIG. 3 shows an energy density versus beam angle relationship for the radar beam of FIG. 2.

The estimation of overall SAR system gain at each of the selected points, for example, the 18 points indicated above, is indicated in block 108 in FIG. 1 and may be, for example, accomplished in the manner outlined in FIGS. 2, 3, and 4 of the drawings herein. The selected number of points, such as the indicated 18 points, are used as a reasonable representation of the, for example, 400 range cell by 400 doppler frequency cell resolution achieved in the mapped area. A detailed discussion of the FIG. 2, 3, and 4 gain estimation is included in the present specification following the description of FIG. 1.

Once the overall gain of the SAR system at each of the selected points is available, it is desirable to fit a mathematically predictable surface to the gain values represented by the individual data points. The use of a parabolic mathematical surface and fitting of this parabolic surface to the points in each of the selected group of points is indicated in the block 110 in FIG. 1. A least squares fitting algorithm is preferred for the block 110 step, however, other mathematical approximation fitting algorithms may be employed. The results of the block 110 operation is, in fact, the parabolic surface which fits the group of estimated points to the best possible degree. The operation of block 110 may be accomplished using a matrix method in which a scaled inverse matrix multiplies the vector of estimated points and thereby provides the coefficients of the parabolic surface. References to the parabolic surface are, of course, exemplary rather than limiting and could relate to other mathematically defined surfaces as is indicated above.

The steps of blocks 102, 104, 106, 108 and 110 in FIG. 1 have been concerned with the characteristics of the SAR system, especially its antenna characteristics and the geometry of the mapping arrangement and have treated these characteristics in a generic or off-line manner. In the block 112, radar signal information, that is real mapping data, is considered and the correction o this data for distance and beam nonuniformity commenced. In the processing of block 112, the data to be corrected is divided into a plurality of groups for parallel processing, the number of groups M, may be, for example, 16 with each group representing the different frequency components occurring over some number of range cells. In the block 112 processing, the coefficients of a parabola in the frequency direction, are obtained for the middle range cell of each data array using the coefficients of the surface computed in the block 110 of FIG. 1.

The number of range cell groups selected, that is, for example, the preferred 16 groups, is a matter of processing convenience with the selected 16 groups being convenient for the data processor of one embodiment of the invention. The result of the block 112 processing is a parabola for each of the 16 signal processing element groups and this parabola is based on the center range gate in a particular processing element. The sampling or accomplishing of gain corrections based on this representative number of range gates rather than basing correction on each of the 400×400 or 160,000 resolution cells is, of course, a compromise arrangement which enables the invention to be used with some practicality, that is, used without requiring excessive amounts of computing and storing capability. Each of the signal processing elements in the block 112 sampling arrangement has a 25×400 section of the mapped area and the same parabolic correction is applied to each of the 25 cells.

In the block 114, the estimated gain for each resolution cell in the frequency direction is computed preferably using a discrete double integrator which is provided with an initial value and first and second derivative values at the point being processed. The integrator is run from the center once in either direction such that cumulative error is symmetric at the edges of the mapped area. The values generated by the integrator represent an estimated gain at each resolution cell. The radar data at these cells must be multiplied by the inverse of the estimated gain to obtain a flat response. Since the range of values of the estimated gain can be limited in voltage magnitude to, for example, signal swings of 0.2 to 1.2 volts, an inverse look up table with normally a relatively small number of entries such as 160 entries is used to obtain the inverse values. Inverse value determination is indicated in block 116 the term reciprocal being used in lieu of the term inverse. The actual multiplication of radar signal data by the block 116 reciprocal of gain values is indicated in block 118 of FIG. 1. As indicated at 120 and 122 in FIG. 1, the preliminary processing of FIG. 1, that is, the processing represented in the blocks 102–112 is preferably accomplished in a floating point computer because the processing is linear rather than parallel and requires the use of logic and functions typical of a floating point computer. The processing steps of blocks 114–118 is preferably accomplished in fixed point parallel array processors. The Because these steps involve a large number of repetitive computations requiring less precision and no logic or functions.

Mathematical Description

As indicated above for the block 108 estimation of gain at several points, the block 108 function and indeed, several of the steps between blocks 108 and 118 in FIG. 1 can be better appreciated from the following mathematical consideration of the accomplished processing—which also includes references to FIGS. 2–4 in the drawings. It is assumed that the beamshape, that is, the contour of 3 dB points in the beam, is known in direction cosine space and that this beamshape is representable as an ellipse having a major axis R1 at an angle phi and minor axis R2 as indicated at 408 in FIG. 4 with the axes R1 and R2 being perpendicular.

The mapping antenna is pointed to a LOS point, indicated by point 212 in FIG. 2 and this LOS point is located at the coordinates of USC and VSC in direction cosine space, corresponding to 412 in FIG. 4. The sample point of interest, the point B at 214 in FIG. 2 is located at the coordinates Up and Vp, corresponding to point 414 in FIG. 4. The distance from the LOS point at the center of the beamshape to the sample point B is given by the component relations:

$$DU = UP - USC \tag{1}$$

$$DV = VP - VCS \tag{2}$$

The radius of the beamshape through the segment connecting the LOS point 212 in FIG. 2 and the sample point 214 in FIG. 2 for an ellipse is indicated by 410 in FIG. 4. The length may be calculated from the relationship:

$$RBW = R1*R2/SQRT(R1*\mathrm{SIN}(ANGLE - PHI)**2 + R2*\mathrm{COS}(ANGLE - PHI)**2) \tag{3}$$

where the symbol * indicates multiplication, the symbol SQRT indicates square root, the symbol SIN represents the mathematical sine function the symbol 2 indicates an exponent of 2 and the symbol COS indicates the mathematical cosine. The angle referred to in equation (3) is the angle that the segment through the LOS point and the sample point makes in direction cosine space with respect to the U axis. The angle between the LOS vector and the vector to the sample point and the angle between the LOS vector and the vector to the 3 dB point, that is point C at 216 in FIG. 2, point C at 310 in FIG. 3 and point C at 416 in FIG. 4** may be determined as follows:

From this angle an estimate of the gain at the sample point can be made by assuming a Gaussian beamshape as shown in FIG. 3 of the drawings—in the plane defined by the LOS vector and the vector to this sample point.

From these relations, the transmitted power at the sample point is given by the relationship $$DBAPP = -3. * ((PTA/BWA)**2) \tag{4}$$

where the term DBAPP indicates the approximated power at the sample point and where PTA is the angle between the LOS vector and a vector to the sample point and BWA is the angle between the LOS vector and a vector to the 3 db point in the same plane as the vector to the sample point. This power value is modified due to range loss which is a function of the ratio of the range along the LOS vector to the range to the sample point.

Each group of sample points for which a gain estimate is obtained must now be fitted by, for example, a least squares fitting method to a convenient surface representing gain as a function of range and frequency. Such a surface is parabolic in both dimensions and can be expressed mathematically as:

$$C1*\mathrm{Rcell}**2 + C2*Fcell**2 + C3*Rcell + C4*Fcell + C5 = GAIN \tag{5}$$

Each group of points is fit to the surface of the above form such that in matrix form, a solution to the following is required.

$$A * C = GAIN \tag{6}$$

where A is a matrix of N rows by 5 columns with N=the number of sample points in the group and C is the vector (C1, C2, C3, C4, C5) and GAIN is a vector of length N containing the calculated gain of each sample point.

The values C1, C2, C3, C4, C5 are obtained by multiplying GAIN by the inverse of A. For simplicity, each group of points with coordinates (Rcell, Fcell) and representing the range cell and frequency cell can be scaled to a square grid running from −1 to +1 in both frequency and range.

The reason for doing this is so that only one inverse matrix of A need be stored. This is because each group has been chosen to have the same number of points distributed in the same manner to within a scale factor.

Once the coefficients C1, C2, C3, C4, and C5 are known a parabola representing gain as a function of frequency cell can be found for any range cell and is obtained from the following relationship $$C2*Fcell**2 + C4Fcell + (C1*Rcell**2 + C3*Rcell + C5) = GAIN \tag{7}$$

wherein the expression in parentheses is constant. To obtain the correct gain at a particular cell, the scaling factors and any shift in the range direction must be included.

The values along the parabola for a particular range cell may be generated at very high speed by a discrete double integrator, for example. The inputs to this integrator correspond to an initial value and a first and second derivative at the initial value point. The values of these derivatives are obtained from coefficients of the parabola for the range cell in question. If the discrete double integrator inputs are selected properly, essentially exact results are produced with the error due only to the finite number of integrator resolution bits; since the error is cumulative, the integrator is preferably run from the center of the frequency cells, once in either direction so that the error resulting is symmetric at the map edges.

The values generated by the integrator represent an estimated gain at each resolution cell. The data at these cells must be multiplied by the inverse of the estimated gain to obtain a flat response. Since the range of values of the estimated *gain* is limited in signal magnitude, that is for example, in *amplitude,* to a range of 0.2 to 1.2 an inverse table look up with, for example, 160 entries, may be used to obtain these values. FIGS. 2, 3, and 4 in the drawings represent 3 different aspects of a doppler SAR mapping situation, views in which three different attributes of the map points labeled A, B, and C in FIG. 2 are defined. In FIG. 2, the points A, B, and C are identified with the numbers 212, 214 and 216 respectively, the mapping aircraft is indicated at 200 and the vectors to the points A, B, and C are indicated by the numbers 202, 204 and 206. Similarly, the angle between the point of interest B at 214 and the LOS vector 202, that is, the angle $\theta$pt is indicated at 210 and the angle $\theta_{BW}$ between the 3 dB point and map center point, that is, the angle between the vectors 202 and 206 is indicated at 208 in FIG. 2.

For an assumed Gaussian beam shape, the relative energy levels from the mapping radar transmitter at the points A, B, and C of FIG. 2 are indicated in the drawing of FIG. 3. In FIG. 3, the waveform 300 indicates the energy level measured along the axis 304 at the relative angle, measured along the axis 302 with respect to the peak energy level at the point A, the point 306. The half power or 3 dB attenuated signal at point C in FIG. 2 is indicated at 310 in the FIG. 3 waveform with the beam width angle being indicated at 312. The energy level at the intermediate point, that is the mapped point of interest, point B, is indicated at 308 in FIG. 2. Relating FIG. 3 to FIG. 2, FIG. 3 shows the beamshape in the plane defined by vectors 202, 204, and 206 in FIG. 2. The translation of the points A, B and C into an antenna related coordinated system, that is, into direction cosine space is indicated in FIG. 4 of the drawings. The beam shape contour 400 is shown to be elliptical in nature with the beamshape ellipse having the major axes 406 and 408 as is indicated above and with the beamshape pattern being plotted along the coordinate axis V and U that are indicated at 402 and 404. The vector joining the points A, B, and C is indicated at 410 with the points A, B, and C along this vector being indicated at 412, 414 and 416 in FIG. 4. The points A, B and C correspond to vectors 202, 204 and 206 in FIG. 2. The gain at the points is found at points 306, 308 and 310 in FIG. 3.

Alternate Arrangements

The herein disclosed compensations for range and antenna pattern may be combined with other known gain curves which are desirably incorporated in the response map of a SAR system by multiplying the curve obtained from the double integrator, that is, the parabolic curve by representations of the other known gain curve to be incorporated. Such multiplication may result in a larger range of values and therefore, a larger inverse look up table than is presently required, however, the concept involved is readily understood from the disclosure herein. In a similar manner, the beamshape in the plane containing the LOS vector, the vector to the sample point and the vector to the 3 dB point can be assumed to be something other than Gaussian in shape if necessary. Other alternate arrangements include a cosine squared shape or a (1/x)*sine(x) shape for the beam.

In many portions of the herein disclosed compensation arrangement, there exists a tradeoff between execution time and achieved accuracy, that is, the time required to perform a function and the accuracy achieved during this time. In this regard, the compensating function of parabolic shape described herein could be generated in a floating decimal point computer routine rather than in the double integrator arrangement disclosed. The double integrator arrangement reduces the time for generation without significantly reducing the achieved accuracy. Similarly, increasing the number of sample points, or the number of groups the sample points are divided into, will result in accuracy increase but also in increased time for computation. If sufficient memory space is available, a correction could be computed for each range cell or smaller groups of range cells to increase the accuracy of the results.

Computer Simulation

The FIG. 5A portion of FIG. 5 shows a computer simulation example in which the contribution of each element of a multiple element antenna that is disposed in a particular range and altitude configuration from a mapped area is considered in predicting an uncompensated signal strength pattern across the mapped area. This simulation can be shown to be accurate within a small fraction of a dB of the values obtained experimentally with a real antenna over the mapped region of interest.

The map of FIG. 5 is shown as shaped on the ground and the intersections are spaced 50 resolutions cells apart. The number at each intersection of the map represents the difference in decibels between the signal strength at that intersection and the signal strength at the peak of the beam, a point which is located in the center of the FIG. 5A map, but is not shown. The largest FIG. 5A absolute error, 7.3 dB, is displayed at the top right corner of the map and information concerning the map geometry including azimuth and range data is displayed along the left edge in FIG. 5A.

Figure 5B:
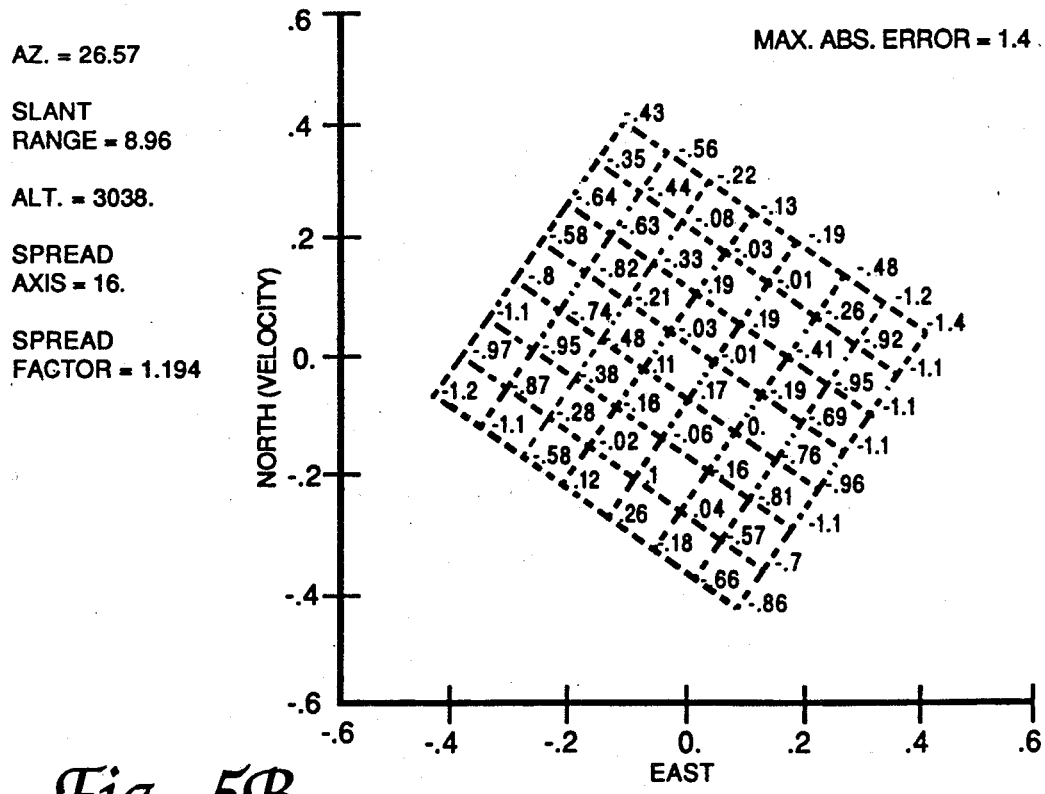

The FIG. 5B portion of FIG. 5 shows the map of FIG. 5A after correction according to the present invention has been applied. The reduced maximum absolute error, a change from 7.3 to 1.4 dB is particularly notable in the FIG. 5A map as is the pattern in which the largest errors cluster.

Similar maps taken at different azimuth and slant range values indicate differing but significant degrees of maximum error reduction as is indicated by the following table of values.

TABLE I

Uncorrected and Corrected Maximum Error Values

| Azimuth (degrees) | Slant Range (miles) | Pre-Correction Max Absolute Error (in dB) | Corrected Max Absolute Error (in dB) |
|---|---|---|---|
| 63.43 | 6.73 | 8.6 | 1.6 |
| 36.87 | 5.02 | 5.2 | 2.0 |
| 45.0 | 14.18 | 6.1 | 0.96 |
| 26.57 | 8.96 | 5.0 | 1.9 |

The computer program by which the FIG. 5 and Table I simulations are accomplished is disclosed herein in the appendix. In this computer program simulation, the Digital Equipment Corporation VAX/VMS version V4.7 programming language is used and annotations of the computer language steps are included in order to enhance the understandability of the simulation program. The computer simulation includes eleven pages of code and includes annotation lines identified with the margin notation "C". Included in the simulation is generation of the required correction parabola by a simulated 24-bit discrete double integrator and an inverse look up table of some 160×12-bit table entries.

While the apparatus and method herein described constitute a preferred embodiment of the invention, it is to be understood that the invention is not limited to this precise form of apparatus or method, and that changes may be made therein without departing from the scope of the invention, which is defined in the appended claims.

The following pages of computer program printout are included in the disclosure of this document as an appendix.

```
C       Note: any subroutine beginning with a "U" is a Template graphics
C       subroutine and is not part of the shading algorithm

      COMMON /ROTATE/ ALOS(3),FLOS(3),FLOSR(3),VO(3),VOR(3),ALPHA(3,3)
      COMMON /PARAMS/ FSO,THSPRD,ROTA,USC,VSC,PATCH,SLANTR,WL
      COMMON /ARRAYS/ X(8,8),Y(8,8),AMP(8,8),Z(8,8),
     &RGCORR(8,8),DIFF(8,8),GAIN(8,8),AINV(1024),PREF(0:229)

      COMMON /BW/        ANTAL,AIRAL,AIRBE,AIRGA,IPOS,RZ1,RZ2,VMAG
      COMMON /COORDS/    GRID1(8),GRID2(8),GRID3(8)
      COMMON /CELL/      DDOPP,FDOPP,DSR
      COMMON /CONSTANT/ CTH1,ELEMO,C1,C2,C3,ALT2

      DIMENSION PLACE(8),V(5,1),CORES(3,1),NRC1(4),NRC2(3),
     &NDC1(3),NDC2(2),PBOLA(16,400)

      NAMELIST /GRAPH/ NRC1,NRC2,NDC1,NDC2,WL,SCALE,NREAD

      OPEN (UNIT=63,FILE='TEMPLATE$:UCONFG.DAT',STATUS='OLD',READONLY)

      OPEN (UNIT=2,FILE='PATCH5.DAT',STATUS='OLD')
      READ (UNIT=2,NML=GRAPH)
      CLOSE (UNIT=2,STATUS='SAVE')

      PRINT *,'Enter 1 to include correction'
      READ  *, NCORR

      CALL READIT (NREAD)
      CALL CALC (ALOS,VO,FLOS,FLOSR,VOR,ALPHA,ANTAL,SLRF)

C       Do template graphics
      CALL UCONFG(63.)
      CALL USTART
      CALL USTUD (PLACE)
      CALL UERASE
      CALL UOPEN ('SEGMENT3')
      CALL USET ('SOFT')
      CALL USET ('ASIZING')
      CALL UVWPRT (0.,PLACE(5),PLACE(7),PLACE(8))
      CALL USET ('PERC')
      CALL UPRINT (0.,90.,'AZ. = \')
      CALL UPRNT1 (ANTAL,'REAL')
      CALL UPRINT (0.,73.,'ALT. = \')
      CALL UPRNT1 (FLOS(3),'REAL')
      CALL UPRINT (0.,66.,'SPREAD\')
      CALL UPRINT (0.,63.,'AXIS = \')
      CALL UPRNT1 (THSPRD,'REAL')
      CALL UPRINT (0.,56.,'SPREAD\')
      CALL UPRINT (0.,53.,'FACTOR = \')
      CALL UPRNT1 (FSO,'REAL')
      CALL UPRINT (0.,83.,'SLANT\')
      CALL UPRINT (0.,80.,'RANGE = \')
      CALL UPRNT1 (SLANTR,'REAL')
      CALL UCLOSE ('SEGMENT3')
      CALL URESET
      CALL USET ('SOFT')
      CALL USET ('ASIZING')
      CALL UVWPRT (PLACE(5),PLACE(6),PLACE(7),PLACE(8))
      CALL UPSET ('PREC',2.)
C       2 DIMENSIONAL GRAPH - Set up axes
```

```
      CALL USET ('XBOTH')
      CALL USET ('YBOTH')
      CALL UPSET ('XLABEL','EAST\')
      CALL UPSET ('YLABEL','NORTH (VELOCITY)\')
      DLIM=PATCH/(6076.0*1.2)
      CALL UAXIS (-DLIM,DLIM,-DLIM,DLIM)

C       Compute the approximate amplitudes of points on the map
      CALL APTLOOP(SLRF,NRC1,NDC1,NRC2,NDC2)
C       Fit them to a parabolic surface
      CALL GRIDFIT (PBOLA)

      CALL USET ('DNUL')

      DO N=1,8
C       Compute the range cell for this swath and the SPE number (INDEXR)
        RPT=-175.+50.*FLOAT(N-1)
        INDEXR=INT(RPT/25.+8.)+1
        IF (INDEXR.GT.16) INDEXR=16
        DO L=1,8
           DPT=ANINT(-200.+57.143*FLOAT(L-1))
           INDEXC=NINT(DPT)+201
           IF (INDEXC.GT.400) INDEXC=400
           DBAPP=PBOLA(INDEXR,INDEXC)
           PREFC=PREF(ABS(NINT(DPT)))
           PREFCDB=20.*LOG10(PREFC)
           DBAPP=DBAPP*PREFC
           INDEX=NINT(DBAPP*SCALE)
           IF (INDEX.LE.0) INDEX=1
           IF (INDEX.GT.NREAD) INDEX=NREAD

           DBAPP = 20.0*LOG10(SCALE*AINV(INDEX))

           IF (NCORR .EQ. 1) THEN
              ERROR=Z(N,(9-L))+DBAPP+PREFCDB
           ELSE
              ERROR=Z(N,(9-L))
           END IF
C       Find the maximum error.
           IF (L.EQ.1 .AND. N.EQ.1) ERRORM=ABS(ERROR)
           IF (ABS(ERROR).GT.ERRORM) ERRORM=ABS(ERROR)
           IF (L.NE.1) CALL UPEN (X(N,L),Y(N,L))
           IF (L.EQ.1) CALL UMOVE (X(N,L),Y(N,L))
           IF (ABS(ERROR).LT..01) ERROR=0.
           CALL UWRIT1 (ERROR,'REAL')
        END DO
        CALL UPAUSE
      END DO

      DO M=1,8
        CALL UMOVE (X(1,M),Y(1,M))
        DO N=2,8
           CALL UPEN (X(N,M),Y(N,M))
        END DO
      END DO

      CALL UPRINT (0.,(DLIM-.05),'MAX. ABS. ERROR = \')
      CALL UPRNT1 (ERRORM,'REAL')

      CALL UPAUSE
```

```
      CALL UEND

      STOP
      END

      SUBROUTINE GRIDFIT(PBOLA)
      DIMENSION COEFF1(5),COEFF2(5),COEFF3(5),AINV(5,8),PBOLA(16,400)
      COMMON/COORDS/GRID1(8),GRID2(8),GRID3(8)

      OPEN (UNIT=1,FILE='AINV.DAT',STATUS='OLD',FORM='FORMATTED')
      READ (1,20) (AINV(N,1),AINV(N,2),AINV(N,3),AINV(N,4),
     &AINV(N,5),AINV(N,6),AINV(N,7),AINV(N,8),N=1,5)
      CLOSE(UNIT=1,STATUS='SAVE')

C       Compute the coefficients of the 2 dimension parabola least squares
C       fitted to the approximate points
      CALL MATMULT (AINV,GRID1,5,8,1,COEFF1)
      CALL MATMULT (AINV,GRID2,5,8,1,COEFF2)
      CALL MATMULT (AINV,GRID3,5,8,1,COEFF3)
C       Compute the points along the center range cell parabola in each SPE
C       using an MRG
      DO N=0,15
        RCELL=-187.5+FLOAT(N)*25.0      !Center Range cell for the SPE
        CALL MRG((N+1),RCELL,COEFF1,COEFF2,COEFF3,-1.0,PBOLA)
        CALL MRG((N+1),RCELL,COEFF1,COEFF2,COEFF3, 1.0,PBOLA)
      END DO

      OPEN (UNIT=1,FILE='COEFF.DAT',STATUS='NEW',FORM='FORMATTED')
      WRITE (1,10) COEFF1
      WRITE (1,10) COEFF2
      WRITE (1,10) COEFF3
      CLOSE (UNIT=1,STATUS='SAVE')

   10 FORMAT (X,5E12.4)
   20 FORMAT (X,8F10.4)
      RETURN
      END

      SUBROUTINE APTLOOP(SLRF,NRC1,NDC1,NRC2,NDC2)

      DIMENSION CTXNA(3,3),NRC1(4),NRC2(3),NDC1(3),NDC2(2),
     &T(3,3),TILT(3,3),CTXNAP(3,3)
      COMMON /ROTATE/ALOS(3),FLOS(3),FLOSR(3),V0(3),V0R(3),ALPHA(3,3)
      COMMON /PARAMS/FS0,THSPRD,ROTA,USC,VSC,PATCH,SLANTR,WL
      COMMON /BW/ANTAL,AIRAL,AIRBE,AIRGA,IPOS,RZ1,RZ2,VMAG
      COMMON/COORDS/GRID1(8),GRID2(8),GRID3(8)
      DATA EP/35.0/

C       Compute the yaw and pitch angle from the velocity vector
        IF (V0(1).NE.0.) THEN
           AIRAL=ATAND(V0(2)/V0(1))
        ELSE
           IF (V0(2).GT.0.0) AIRAL =  90.0
           IF (V0(2).LT.0.0) AIRAL = -90.0
        END IF
        AIRBE=ATAND(-V0(3)/SQRT(V0(1)**2+V0(2)**2))

cccccccccccccccccccccccccccccccccccccccccccccccccccccccccccccccccccccc

       IF (IPOS.EQ.1) THEN
```

```
C        TRANSFORMATION MATRIX FOR ANTENNA IN RIGHT DETENT POSITION
         TILT(1,1) =  0.5783326348
         TILT(1,2) =  0.8137976804
         TILT(1,3) =  0.0571375440
         TILT(2,1) = -0.3971312588
         TILT(2,2) =  0.3420201430
         TILT(2,3) = -0.8516507413
         TILT(3,1) = -0.7126135887
         TILT(3,2) =  0.4698463124
         TILT(3,3) =  0.5209859076

      ELSE IF (IPOS.EQ.2) THEN
C        TRANSFORMATION MATRIX FOR ANTENNA IN LEFT DETENT POSITION
         TILT(1,1) =  0.5783326348
         TILT(1,2) = -0.8137976804
         TILT(1,3) =  0.0571375440
         TILT(2,1) =  0.3971312588
         TILT(2,2) =  0.3420201430
         TILT(2,3) =  0.8516507413
         TILT(3,1) = -0.7126135887
         TILT(3,2) = -0.4698463124
         TILT(3,3) =  0.5209859076

      ELSE
C        TRANSFORMATION MATRIX FOR ANTENNA IN FORWARD POSITION
         CEP = COSD(EP)
         SEP = SIND(EP)
         TILT(1,1) =  CEP
         TILT(1,3) =  SEP
         TILT(2,2) =  1.0
         TILT(3,1) = -SEP
         TILT(3,3) =  CEP
      END IF

C     AIRAL:YAW   AIRBE:PITCH   AIRGA:ROLL
      CAIRAL = COSD(AIRAL)
      SAIRAL = SIND(AIRAL)
      CAIRBE = COSD(AIRBE)
      SAIRBE = SIND(AIRBE)
      CAIRGA = COSD(AIRGA)
      SAIRGA = SIND(AIRGA)

C     TRANSFORMATION MATRIX FOR GIVEN YAW, PITCH AND ROLL
C     THIS MATRIX TAKES THE NAV. UNIT VECTOR TO CASE UNIT VECTOR
      T(1,1) =   CAIRBE*CAIRAL
      T(1,2) =   CAIRBE*SAIRAL
      T(1,3) =  -SAIRBE
      T(2,1) = (-CAIRGA*SAIRAL) + (SAIRGA*SAIRBE*CAIRAL)
      T(2,2) = ( CAIRGA*CAIRAL) + (SAIRGA*SAIRBE*SAIRAL)
      T(2,3) = ( SAIRGA*CAIRBE)
      T(3,1) = ( SAIRGA*SAIRAL) + (CAIRGA*SAIRBE*CAIRAL)
      T(3,2) = (-SAIRGA*CAIRAL) + (CAIRGA*SAIRBE*SAIRAL)
      T(3,3) =   CAIRGA*CAIRBE

      CALL MATMULT (TILT,T,3,3,3,CTXNA)
      CALL MATMULT (CTXNA,ALPHA,3,3,3,CTXNAP)

CCCCCCCCCCCCCCCCCCCCCCCCCCCCCCCCCCCCCCCCCCCCCCCCCCCCCCCCCCCCCCCCCCCCCCCCCCCC

      CALL LRDFREQ(SLRF)
```

```
      CALL INIT

C       Compute 18 approximate amplitudes of points on the map
      DO NRCELL=1,4
         RCELL=FLOAT(NRC1(NRCELL))
         DO NDCELL=1,3
            DCELL=FLOAT(NDC1(NDCELL))
            NDCELL1=NDCELL+5
            CALL AONEPT (CTXNAP,SLRF,RCELL,DCELL,DBAPP)
            IF (NRCELL.EQ.1) THEN
               GRID1(NDCELL)=DBAPP
            ELSE IF (NRCELL.EQ.2) THEN
               GRID1(NDCELL1)=DBAPP
               GRID2(NDCELL)=DBAPP
            ELSE IF (NRCELL.EQ.3) THEN
               GRID2(NDCELL1)=DBAPP
               GRID3(NDCELL)=DBAPP
            ELSE IF (NRCELL.EQ.4) THEN
               GRID3(NDCELL1)=DBAPP
            END IF
         END DO
      END DO
      DO NRCELL=1,3
         RCELL=FLOAT(NRC2(NRCELL))
         DO NDCELL=1,2
            DCELL=FLOAT(NDC2(NDCELL))
            NDCELL1=NDCELL+3
            CALL AONEPT (CTXNAP,SLRF,RCELL,DCELL,DBAPP)
            IF (NRCELL.EQ.1) THEN
               GRID1(NDCELL1)=DBAPP
            ELSE IF (NRCELL.EQ.2) THEN
               GRID2(NDCELL1)=DBAPP
            ELSE IF (NRCELL.EQ.3) THEN
               GRID3(NDCELL1)=DBAPP
            END IF
         END DO
      END DO
      RETURN
      END

      SUBROUTINE AONEPT (CTXNA,SLRF,RCELL,DCELL,DBAPP)

C       This subroutine computes the gain in dB of a single point on the map
C       given by the range cell RCELL and the doppler cell DCELL

      COMMON /ROTATE/ALOS(3),FLOS(3),FLOSR(3),VO(3),VOR(3),ALPHA(3,3)
      COMMON /BW/ANTAL,AIRAL,AIRBE,AIRGA,IPOS,RZ1,RZ2,VMAG
      COMMON/CELL/DDOPP,FDOPP,DSR
      COMMON /CONSTANT/CTH1,ELEMO,C1,C2,C3,ALT2
      DIMENSION R(3)

      SR     = SLRF+RCELL*DSR
      DFREQ  = FDOPP-DDOPP*DCELL
      CTHETA = C3*DFREQ
      R(1) = SR*CTHETA*C1-C2                    !R is the Nav vector to point
      R(2) = SQRT(SR**2-R(1)**2-ALT2)           !on the map given by
      IF (ANTAL.LT.0.) R(2)=-R(2)               !(RCELL,DCELL)
      R(3) = FLOSR(3)
C       convert R to a unit vector
      SR1  = 1.0/SR                             !1/Slant range to point
```

```
      R(1) = R(1)*SR1
      R(2) = R(2)*SR1
      R(3) = R(3)*SR1
C       compute the ratio of the range to the center of the map versus the
C       range to (RCELL,DCELL)
      RRATIO=SLRF*SR1
C       convert R to antenna coordinates
      CALL NAVTANT(CTXNA,R)
C       Compute the approximate amplitude of the point and multiply by the
C       range effect
      CALL APPROX (-R(3),R(2),DBAPP)
      DBAPP = DBAPP*(RRATIO**2)

      RETURN
      END

      SUBROUTINE APPROX (PX,PY,DBAPP)

C       This subroutine computes the amplitude of a point in direction cosine
C       space given by PX,PY given an elliptical beamshape defined by RZ1,RZ2
C       and axis ROTA.  It assumes a gaussian beamshape along any cut through
C       the center of the beam

      COMMON /PARAMS/FSO,THSPRD,ROTA,USC,VSC,PATCH,SLANTR,WL
      COMMON /BW/ANTAL,AIRAL,AIRBE,AIRGA,IPOS,RZ1,RZ2,VMAG
      COMMON /CONSTANT/CTH1,ELEMO,C1,C2,C3,ALT2

      DU=PX-USC
      CTH2=SQRT(1.0-(PX**2+PY**2))
      ANGLE=ATAND((PY-VSC)/DU)
      IF (DU.LT.0.0) ANGLE=ANGLE+180.0
      AROTA=ANGLE-ROTA
      RBW=RZ1*RZ2/SQRT((RZ1*SIND(AROTA))**2+(RZ2*COSD(AROTA))**2)

      UBW=USC+RBW*COSD(ANGLE)
      VBW=VSC+RBW*SIND(ANGLE)

      CTHBW=SQRT(1.0-(UBW**2+VBW**2))
      BWA=ACOS(CTH1*CTHBW+USC*UBW+VSC*VBW)
      PTA=ACOS(CTH1*CTH2+USC*PX+VSC*PY)

      DBAPP=-3.0*((PTA/BWA)**2)
C       Compute element factor
      CALL ELEMENT (PX,PY,ELEM)

      DBAPP=DBAPP+10.0*LOG10(ELEM/ELEMO)
      DBAPP=10.0**(DBAPP/10.0)

      RETURN
      END

      SUBROUTINE ELEMENT (PX,PY,ELEM)

      THETA=ASIND(SQRT(PX**2+PY**2))
      IF (THETA.LE.54.0) THEN
         ELEM=COSD(THETA)
      ELSE
         ELEM=(1.9164487E-3)+(4.603505E-4)*((90.0-THETA)**2.0)
      END IF
      RETURN
```

```
      END

      SUBROUTINE LRDFREQ(SLRF)

      COMMON /ROTATE/ALOS(3),FLOS(3),FLOSR(3),VO(3),VOR(3),ALPHA(3,3)
      COMMON /PARAMS/FSO,THSPRD,ROTA,USC,VSC,PATCH,SLANTR,WL
      COMMON /BW/ANTAL,AIRAL,AIRBE,AIRGA,IPOS,RZ1,RZ2,VMAG
      COMMON/CELL/DDOPP,FDOPP,DSR

      ROTA=THSPRD-90.0
      DSR=PATCH*.0025                    !Cell width in range
      VMAG=SQRT(VOR(1)**2+VOR(3)**2)
C       Compute coherent integration time
      TCOH=ABS(WL*SLRF/(24.0*DSR*VMAG*SIND(ANTAL)))
      DDOPP=1.0/TCOH                     !Cell width in frequency
C       Compute the velocity along the line of sight and then the doppler
C       frequency at the center of the map assuming a 0.1 ft wavelength
      VF1=1.0/(VMAG*SLRF)
      VVF1=VOR(3)*FLOSR(3)*VF1
      VVF2=VOR(1)*VF1
      CTHETAV=VVF2*FLOSR(1)+VVF1
      VWL1=VMAG*24.0/WL
      FDOPP=CTHETAV*VWL1      !Doppler freq. center of patch
      RETURN
      END

      SUBROUTINE MATMULT (A,B,NRA,NCA,NCB,S)
      DIMENSION S(NRA,NCB),A(NRA,NCA),B(NCA,NCB)
C       Matrix multiplication
      DO I=1,NRA
         DO K=1,NCB
            SUM=0.0
            DO L=1,NCA
               SUM=SUM+A(I,L)*B(L,K)
            END DO
            S(I,K)=SUM
         END DO
      END DO

      RETURN
      END

      SUBROUTINE NAVTANT (CTXNA,XYZ)
      DIMENSION XYZ (3,1),Q(3,1)
      CALL MATMULT (CTXNA,XYZ,3,3,1,Q)
      DO N=1,3
         XYZ(N,1)=Q(N,1)
      END DO
      RETURN
      END

      SUBROUTINE READIT (NREAD)
      COMMON /ROTATE/ALOS(3),FLOS(3),FLOSR(3),VO(3),VOR(3),ALPHA(3,3)
      COMMON /PARAMS/FSO,THSPRD,ROTA,USC,VSC,PATCH,SLANTR,WL
      COMMON /ARRAYS/X(8,8),Y(8,8),AMP(8,8),Z(8,8),
     &RGCORR(8,8),DIFF(8,8),GAIN(8,8),AINV(1024),PREF(0:229)
      COMMON /BW/ANTAL,AIRAL,AIRBE,AIRGA,IPOS,RZ1,RZ2,VMAG

C       Read in the inverse look up table
      OPEN (UNIT=1,FILE='INVLUT.DAT',STATUS='OLD',FORM='FORMATTED')
```

```
      READ (1,100) (N,AINV(M),M=1,NREAD)
      CLOSE (UNIT=1,STATUS='SAVE')

C       Read in the prefilter gain table
      OPEN (UNIT=1,FILE='PREF.DAT',STATUS='OLD',FORM='FORMATTED')
      READ (1,200) (N,PREF(M),M=0,229)
      CLOSE(UNIT=1,STATUS='SAVE')

C       Read in the scenario data and the actual gains of points on the map
      OPEN (UNIT=1,FILE='ARRAY.DAT',STATUS='OLD',FORM='FORMATTED')
      READ (1,10) FSO,THSPRD,USC,VSC,PATCH
      READ (1,20) SLANTR,ALOS(1),ALOS(2),ALOS(3)
      READ (1,40) AIRGA,VO(1),VO(2),VO(3)
      READ (1,50) IPOS,RZ1,RZ2
      DO N=1,8
         DO M=1,8
            READ (1,30) X(N,M),Y(N,M),U,V,AMP(N,M),RGCORR(N,M)
            X(N,M)=X(N,M)/6076.0
            Y(N,M)=Y(N,M)/6076.0
            AMP(N,M)=AMP(N,M)*2.0                !Two way in dB (beamshape only)
            GAIN(N,M)=10.0**(RGCORR(N,M)/10.0) !Two way amp. with range effects
            Z(N,M)=20.0*LOG10(GAIN(N,M))         !2 way dB with range effects
         END DO
      END DO
      CLOSE (UNIT=1,STATUS='SAVE')

   10 FORMAT(X,2F10.3,X,2F14.8,X,F10.1)
   20 FORMAT(X,F7.2,X,3F10.2)
   30 FORMAT(X,2F10.1,X,2F10.4,X,2F8.2)
   40 FORMAT (X,F7.2,X,3F10.3)
   50 FORMAT (X,I,X,2E18.8)
  100 FORMAT (X,I5,X,F16.8)
  200 FORMAT (X,I5,F10.4)
      RETURN
      END

      SUBROUTINE INIT

      COMMON /ROTATE/ALOS(3),FLOS(3),FLOSR(3),VO(3),VOR(3),ALPHA(3,3)
      COMMON /BW/ANTAL,AIRAL,AIRBE,AIRGA,IPOS,RZ1,RZ2,VMAG
      COMMON /PARAMS/FSO,THSPRD,ROTA,USC,VSC,PATCH,SLANTR,WL
      COMMON /CONSTANT/CTH1,ELEMO,C1,C2,C3,ALT2

      CTH1=SQRT(1.0-(USC**2+VSC**2))
      CALL ELEMENT (USC,VSC,ELEMO)
      VELXI=1.0/VOR(1)
      C1 = VMAG*VELXI
      C2 = FLOSR(3)*VOR(3)*VELXI
      C3 = WL/(24.0*VMAG)
      ALT2=FLOSR(3)**2

      RETURN
      END

        SUBROUTINE CALC(ALOS,VO,FLOS,FLOSR,VOR,ALPHA,ANTAL,SLRF)

        DIMENSION ALOS(3),VO(3),FLOS(3),FLOSR(3),VOR(3),
     &  ALPHA(3,3),GP(2),GPV(2)

C       Compute the slant range in Nmi
```

```
      SLANTR = SQRT(ALOS(1)**2+ALOS(2)**2+ALOS(3)**2)
C     Compute the LOS in feet
      DO N=1,3
         FLOS(N) = ALOS(N)*6076.0
      END DO

C     Compute the ground range in feet
      RGI2 = FLOS(1)**2+FLOS(2)**2
      RGI  = SQRT(RGI2)

C     Compute the slant range in feet
      SLRF = SQRT(RGI2+FLOS(3)**2)

C     Compute the ground velocity magnitude and the velocity magnitude
      GVMAG2 = VO(1)**2+VO(2)**2
      GVMAG  = SQRT(GVMAG2)
      VMAG   = SQRT(GVMAG2+VO(3)**2)

      VOR(1) = GVMAG
      VOR(2) = 0.0
      VOR(3) = VO(3)

      SINAL = VO(2)/GVMAG
      COSAL = VO(1)/GVMAG

      ALPHA(1,1) =  COSAL
      ALPHA(1,2) = -SINAL
      ALPHA(2,1) =  SINAL
      ALPHA(2,2) =  COSAL
      ALPHA(3,3) =  1.0

     DO N=1,2
       GP(N)  = FLOS(N)/RGI
       GPV(N) = VO(N)/GVMAG
     END DO

       FLOSR(1) = COSAL*FLOS(1)+SINAL*FLOS(2)
       FLOSR(2) = COSAL*FLOS(2)-SINAL*FLOS(1)
       FLOSR(3) = FLOS(3)

       A = GP(1)*GPV(1) + GP(2)*GPV(2)
       B = GP(2)*GPV(1) - GP(1)*GPV(2)

       IF (A.NE.0.0) THEN
          ANTAL = ATAND(B/A)
          IF (A.LT.0.0) THEN
             IF (B.GT.0.0) ANTAL = ANTAL+180.0
             IF (B.LT.0.0) ANTAL = ANTAL-180.0
          END IF
       ELSE
          IF (B.LT.0.0) ANTAL = -90.0
          IF (B.GT.0.0) ANTAL =  90.0
       END IF
       RETURN
       END

       SUBROUTINE MRG(NROW,RCELL,COEFF1,COEFF2,COEFF3,DIREC,PBOLA)

       DIMENSION C(5),COEFF1(5),COEFF2(5),COEFF3(5),PBOLA(16,400)
       DATA NTOTB,NFRACB,NSIGN/23,22,1/
```

```
C       Determine which surface coefficients to use and compute the shifted
C       Range cell

        IF (RCELL.LT.-75.0) THEN
           DO N=1,5
              C(N)=COEFF1(N)
           END DO
           RC=RCELL+112.0
        ELSE IF (RCELL.GT.75.0) THEN
           RC=RCELL-112.0
           DO N=1,5
              C(N)=COEFF3(N)
           END DO
        ELSE
           DO N=1,5
              C(N)=COEFF2(N)
           END DO
           RC=RCELL
        END IF

C       Scale the shifted range cell
        RC=RC/84.0
C       Compute the MRG coefficients and convert them to integers
        F1=2.0*C(2)/(200.0**2)
        F2=C(2)/(200.0**2)+DIREC*C(4)/200.0
        F0=C(1)*RC**2+C(3)*RC+C(5)
        CALL WXFX (NTOTB,NFRACB,NSIGN,-1,F1,NF1)
        CALL WXFX(NTOTB,NFRACB,NSIGN,-1,F2,NSTO1)
        CALL WXFX(NTOTB,NFRACB,NSIGN,-1,F0,NSTO2)

C       Compute points along the parabola using the MRG
        DO N=1,200
           NCOUNT=200+NINT(DIREC)*N
           IF (DIREC.LT.0.0) NCOUNT=NCOUNT+1
           NRESULT=NSTO1+NSTO2
           NSTO1=NSTO1+NF1
           NSTO2=NRESULT
           CALL WXFX (NTOTB,NFRACB,NSIGN,1,RESULT,NRESULT)
           PBOLA(NROW,NCOUNT)=RESULT
        END DO

        RETURN
        END

        SUBROUTINE WXFX (NTOTB,NFRACB,NSIGN,NFR,ANUM,N)

        IF (NFR.EQ.1) ANUM=0.0
        IF (NFR.EQ.-1) N=0
        NANDW=0
        DO NLOOP=1,(NTOTB-NFRACB)
           NANDW=NANDW+2**(NTOTB-NLOOP)
        END DO
        NANDF=2**(NFRACB)-1
        QUANTA=1.0/FLOAT(NANDF+1)
        IF (NFR.EQ.1) THEN
           NW=IAND(NANDW,ABS(N))
           NWS=ISHFT(NW,-NFRACB)
           NF=IAND(NANDF,ABS(N))
           FRAC=NF*QUANTA
```

```
      ANUM=FLOAT(NWS)+FRAC
      IF (NSIGN.EQ.1 .AND. N.LT.0) ANUM=-ANUM
   ELSE IF (NFR.EQ.-1) THEN
      NWS=INT(ABS(ANUM))
      NW=ISHFT(NWS,NFRACB)
      FRAC=ABS(ANUM)-FLOAT(NWS)
      NF=NINT(FRAC/QUANTA)
      N=NW+NF
      IF (NSIGN.EQ.1 .AND. ANUM.LT.0.0) N=-N
   END IF
   RETURN
   END
```

I claim:

1. A method for amplitude equalizing the target return echo signals of a batch processed synthetic aperture pulsed doppler radar in accommodation of beam shape and target range perturbations of the return signal amplitudes over a target scene frame comprising the steps of:

storing a target scene frame array of doppler frequency and range domain radar echo signal amplitudes data, said data being organized according to range cells dispersed across said target scene frame;

selecting a predetermined number of points in the doppler frequency and range domain for performing antenna beam shape gain determinations;

transforming the location of said gain determination points from the doppler frequency and range domain into points within the domain of an antenna face related coordinate system;

performing antenna pattern gain determinations at each of said antenna coordinate domain points assuming a predetermined three dimensional beam shape;

incorporating range attenuation effect correction into each of said antenna coordinate domain points gain determinations;

determining the numeric coeffecients for a selected mathematically definable three dimensional gain surface extending in both the frequency and range directions, said gain surface being optimally conformed with said range attenuation effect correction inclusive antenna coordinate domain points;

dividing said mathematically definable three dimensional gain surface into a predetermined number of range associated bands, each band including all of the frequency related gain surface values for a selected span of range values;

ascertaining for the central most range values in each of said range bands, the numerical coefficients of a gain surface resident two-dimensional mathematical curve of gain versus frequency;

computing from each of said two-dimensional mathematical curves the gain values at predetermined range cell locations disposed along each said curve;

generating from said gain values a resolution cell dispersed array of inverse gain magnitude values;

multiplying the amplitude values of said target frame range cell data by range cell respective inverse gain array values.

2. The method of claim 1 wherein said points in the domain of doppler frequency and doppler range are divided into N groups.

3. The method of claim 2 wherein N has a value of three.

4. The method of claim 1 wherein said antenna face related coordinate system is the direction cosine space domain.

5. The method of claim 1 wherein said beam shape is Gaussian in nature.

6. The method of claim 1 wherein said selected three-dimensional gain surface is parabolic in both the frequency and range directions.

7. The method of claim 6 wherein said optimally conformed gain surface is fitted by a least squares fitting method.

8. The method of claim 1 wherein said range associated bands are sixteen in number.

9. The method of claim 1 wherein said ascertaining step numerical coefficients computations are performed by a discrete double integrator.

10. The method of claim 1 wherein said discrete double integrator is operated from the center of said target scene once in each direction and generates symmetric errors at the scene edges.

11. The method of claim 1 wherein said inverse gain magnitude values are generated from a look up table array of values.

12. The method of claim 1 wherein said step of performing antenna pattern gain determinations includes mathematically estimating the gain for a sample point from the 3-decibel signal locus and the known geometric relationships in the radar beamshape.

13. The method of claim 1 wherein said target scene frame is resolved into a resolution cell grid of at least four hundred cells per side.

14. The method of claim 1 wherein said antenna pattern gain determination performance step includes selecting a sample set of cells and mathematically estimating the gain for each said sample cell using sample cell subset least squares fitting.

* * * * *